United States Patent
Schinzel et al.

(10) Patent No.: US 9,552,919 B2
(45) Date of Patent: Jan. 24, 2017

(54) COUPLING DEVICE FOR A MULTI-PHASE CONVERTER

(71) Applicant: Robert Bosch GmbH, Stuttgart (DE)

(72) Inventors: Mirko Schinzel, Stuttgart (DE); Nils Draese, Feuerbach (DE)

(73) Assignee: Robert Bosch GmbH, Stuttgart (DE)

(*) Notice: Subject to any disclaimer, the term of this patent is extended or adjusted under 35 U.S.C. 154(b) by 122 days.

(21) Appl. No.: 14/379,331

(22) PCT Filed: Feb. 20, 2013

(86) PCT No.: PCT/EP2013/053336
§ 371 (c)(1),
(2) Date: Aug. 18, 2014

(87) PCT Pub. No.: WO2013/124294
PCT Pub. Date: Aug. 29, 2013

(65) Prior Publication Data
US 2015/0028844 A1 Jan. 29, 2015

(30) Foreign Application Priority Data
Feb. 20, 2012 (DE) .................... 10 2012 202 578

(51) Int. Cl.
*H01F 27/28* (2006.01)
*H01F 27/24* (2006.01)
(Continued)

(52) U.S. Cl.
CPC ............... *H01F 30/12* (2013.01); *G05F 3/08* (2013.01); *H01F 27/38* (2013.01); *H01F 38/14* (2013.01);
(Continued)

(58) Field of Classification Search
CPC .... H01F 38/14; H01F 30/14; H01F 2038/026; G05F 3/08; H02M 3/1584; H02M 2003/1586; H02M 3/22; H02M 2001/0048
(Continued)

(56) References Cited

U.S. PATENT DOCUMENTS 3,742,408 A * 6/1973 Jaeger .................. H01F 38/14
330/174
4,639,705 A * 1/1987 Beisser .................. H01F 41/02
336/196
(Continued)

FOREIGN PATENT DOCUMENTS

DE 102010040222 3/2012
EP 2081287 7/2009
WO 2012028558 3/2012

OTHER PUBLICATIONS

International Search Report for Application No. PCT/EP2013/053336 dated May 13, 2014 (English Translation, 2 pages).
(Continued)

*Primary Examiner* — Elvin G Enad
*Assistant Examiner* — Kazi Hossain
(74) *Attorney, Agent, or Firm* — Michael Best & Friedrich LLP

(57) ABSTRACT

The invention relates to a coupling device (4) for four phases of a multi-phase converter (2). Said coupling device (4) includes four coupling modules (6, 8, 12, 14), each of which encompasses four parallel through-holes. At least one section of a conductor loop (18, 20, 22, 24) for a phase. At least one section of a conductor loop (18, 20, 22, 24) for a phase penetrates a through-hole of a coupling module (6, 8, 12, 14), sections of conductor loops (18, 20, 22, 24) for at least two phases penetrating all four through-holes of a coupling module (6, 8, 12, 14).

10 Claims, 8 Drawing Sheets

(51) Int. Cl.
| | |
|---|---|
| *H01F 17/04* | (2006.01) |
| *H01F 30/12* | (2006.01) |
| *H02M 3/158* | (2006.01) |
| *H01F 27/38* | (2006.01) |
| *H01F 38/14* | (2006.01) |
| *H02M 3/22* | (2006.01) |
| *G05F 3/08* | (2006.01) |
| *H01F 30/14* | (2006.01) |
| *H02M 1/00* | (2006.01) |
| *H01F 3/14* | (2006.01) |
| *H01F 38/02* | (2006.01) |

(52) U.S. Cl.
CPC .............. *H02M 3/1584* (2013.01); *H02M 3/22* (2013.01); *H01F 3/14* (2013.01); *H01F 30/14* (2013.01); *H01F 2038/026* (2013.01); *H02M 2001/0048* (2013.01); *H02M 2003/1586* (2013.01)

(58) Field of Classification Search
USPC .. 336/180, 12, 5, 170, 212, 221.12; 323/361
See application file for complete search history.

(56) References Cited

U.S. PATENT DOCUMENTS

| | | | | | |
|---|---|---|---|---|---|
| 5,053,738 | A | * | 10/1991 | Sato | ........................ H01F 38/10 336/165 |
| 5,177,460 | A | * | 1/1993 | Dhyanchand | ............ H02M 7/49 336/12 |
| 5,481,238 | A | * | 1/1996 | Carsten | ...................... G05F 1/24 323/259 |
| 5,841,335 | A | * | 11/1998 | Onishi | ..................... H01F 37/00 336/170 |
| 5,909,069 | A | | 6/1999 | Allen et al. | |
| 2009/0179723 | A1 | | 7/2009 | Ikriannikov et al. | |
| 2009/0231081 | A1 | | 9/2009 | Ikriannikov et al. | |
| 2010/0321142 | A1 | * | 12/2010 | Tabuchi | ................ H01F 27/006 336/184 |
| 2012/0098633 | A1 | * | 4/2012 | Schlenk | .................. H01F 30/04 336/170 |
| 2013/0154582 | A1 | | 6/2013 | Draese et al. | |
| 2013/0162225 | A1 | | 6/2013 | Draese et al. | |

OTHER PUBLICATIONS

Zumel et al., "Tight magnetic coupling in multiphase interleaved converters based on simple transformers," Applied Power Electronics Conference and Exposition, 2005, Twentieth Annual IEEE Austin, TX, USA Mar. 6-10, 2005, vol. 1, pp. 385-391.

Czogalla et al., "Automotive application of multi-phase coupled-inductor DC-DC converter," Conference Record of the 2003 IEEE Industry Applications Conference, 38th IAS Annual Meeting, Salt Lake City, UT, Oct. 12-16, 2003, vol. 3, pp. 1524-1529.

\* cited by examiner

COUPLING DEVICE FOR A MULTI-PHASE CONVERTER

BACKGROUND OF THE INVENTION

The invention relates to a coupling device for a multi-phase converter and a multi-phase converter.

A power converter, which can also be referred to as a direct current converter or DC-DC converter, is designed to convert a DC voltage at an input into a DC voltage having another voltage level. Such a power converter can also be designed as a multi-phase converter comprising coupled inductors. Coupled multi-phase converters comprise a plurality of phases, wherein each phase is passed through a current carrying conductor, said phases being coupled to one another by means of magnetic coupling means. A current ripple through the magnetic coupling, which is generated by each phase, can however impair the operation of the multi-phase converter. That is why sections of the individual conductors are to be suitably arranged relative to one another in order, for example, to prevent disadvantages from occurring in an electromagnetic compatibility.

The WIPO patent publication WO 2012/028558 A1 describes a multi-phase converter in which a mutual interference of the phases is minimized and a large portion of the magnetic flux is compensated by means of the magnetically oppositely-directed coupling of one phase of at least six phases comprising at least three further phases. The phases to be coupled are thereby selected such that an optimal compensation can be achieved. This results from an oppositely-directed current profile of the phases. The goal here is for the phases to be magnetically coupled in such a way that the resulting magnetic field is minimized due to the coupled phases. In so doing, a ferrite core is used for coupling the magnetic fluxes in order to profit from the high permeability of the material. In the case of the coupling proposed here, the phases can be actuated successively and independently of one another.

SUMMARY OF THE INVENTION

In light of the above, a coupling device and a multi-phase converter according to the invention are proposed.

The embodiment of the compactly constructed coupling device for the multi-phase converter, which, e.g., is designed as a four-phase converter, includes four phases comprising coupled inductors. In this regard, the coupling device has four coupling modules designed as cores, wherein at least two phases are in each case coupled to one another in a plane. Two coupling modules can typically be disposed next to one another in a plane. Two coupling modules rotated by 90 degrees can be disposed next to one another in a plane located or disposed behind the aforementioned plane. Each of the at least two phases is coupled in each case to at least one further phase in a plane. If the phases are actuated in an offset manner, a coupling of each phase to the phase preceding it as a predecessor as well as to the phase succeeding it as a successor results in the case of a typically endless sequence: first phase-second phase-third phase-fourth phase-first phase-second phase etc.

Irrespective of the number of the phases, each electronic coupling module of the multi-phase converter is designed in a flat or planar manner and comprises at least one component designed as the coil core or ferrite core. Such a component can have at least one ground groove for providing a through-hole. As a rule, a coupling module comprises a plurality of components, wherein respectively one through-hole can be encompassed by a groove in a first component and a second component. In so doing, two adjacent through-holes of a coupling module can be connected in each case to one another via a slot, which, for example, is designed as an air gap. In the slot, a leakage flux can be defined without any particular mechanical outlay for each phase that flows through. As a result, an optimized EMC behavior and therefore an optimized electromagnetic compatibility can be achieved for the multi-phase converter.

Provision can furthermore be made for two windings and therefore two sections of a conductor loop provided for the phase to penetrate a coupling module per phase. As a result, a reduced magnetic modulation of the coupling module by means of voltage-time integrals, e.g. voltage-time areas, of the magnetic fluxes of the phases occurs as well as very small core losses. As a rule, it is not necessary to cool down the coupling modules. Each conductor loop for a phase has a metallic wire which is wrapped with insulating material. A voltage for the phase is applied to each conductor loop. In addition, a current provided for the phase flows through each conductor loop.

Each through-hole of a coupling module, which, for example, comprises two of such through-holes, can furthermore have a large winding window, into which a piece of copper having a large cross section can be introduced, whereby winding resistances in the range of less than 1 mOhm to a few mOhm can be facilitated.

In addition, at least one main path of the multi-phase converter comprises two sections or windings of a conductor loop per phase, wherein each phase along the at least one main path is encompassed by highly permeable material of the coupling module so that an air gap as slot is either not provided or only a very small air gap in comparison to a leakage path, which gap has a small width, is provided along the at least one main path. As a result, inductances in the range of typically 10 µH to 50 µH can be implemented with only two windings.

The multi-phase converter can be designed as a low voltage converter and can be used in the automotive field, wherein high performance rates and efficiency levels can be achieved. Conductor loops for providing the phases can be wires made from copper which have a small electrical resistance, whereby the level of efficiency of the four-phase converter is increased. The wires can furthermore be coated with plastic or lacquer. The four-phase converter furthermore has low stand-by losses and thereby a high level of efficiency at low loads. A high level of dynamics can be achieved by the coupling of the phases provided by the invention. A leakage flux of the typically four phases of the multi-phase converter designed as a four-phase converter can be simply adapted by the dimensioning of a slot between the adjacent through-holes, whereby the electromagnetic compatibility can be adapted to the load requirements. In addition, the conductor loops are short because each phase is led out of that coupling module exactly at the point where it again penetrates said module. As a result, a phase can be directly connected with and/or via a capacitor to a switching cell which promotes the electromagnetic compatibility.

An embodiment of a four-phase converter and therefore a four-phase multi-phase converter can therefore be provided in which inductors of the four phases are coupled via four coupling modules. A coupling concept is implemented with the four-phase converter which is suitable for high power converters and designed for demands in the automotive field.

Because only four phases are coupled in this embodiment, an excessively high coupling is thereby intended to be prevented in contrast to multi-phase converters comprising more than four phases. As a result, problems with regard to the electromagnetic compatibility can be reduced by too good a coupling. This is made possible by means of an additional leakage path for a leakage flux. The four-phase converter is furthermore simply and compactly constructed, whereby manufacturing costs can be saved. A beginning of a conductor loop for respectively one phase that is guided into the four-phase converter and an end of the conductor loop that is guided out of said four-phase converter lie spatially in close proximity to one another; thus enabling disadvantages for the electromagnetic compatibility to be reduced in comparison to sections of a conductor loop through which the phase is guided and which are spaced too far apart from one another. In the event of the four-phase converter being operated at idle, high core losses can furthermore be prevented and correspondingly a degree of efficiency can be improved at low load conditions.

In a further embodiment, the number of sections or windings of a conductor loop that are to be mounted to a coupling module can be varied. A guidance of the individual phases outside of the coupling modules of the multi-phase converter can likewise be flexibly adjusted. Connections, i.e. a beginning and an end of the individual phases, can therefore be distributed on both sides of at least one coupling module. It is also possible to contact all phases on one side of at least one coupling module.

In a further embodiment of the proposed coupling device, the phases can furthermore have oppositely directed current profiles, wherein a strength of the resulting magnetic field is reduced by magnetically coupling the phase. During an operation of the multi-phase converter, which comprises at least one coupling device for the phases, the phases of an intended sequence can furthermore be correspondingly actuated in succession as well as independently of one another.

BRIEF DESCRIPTION OF THE DRAWINGS

Further advantages and embodiments of the invention ensue from the description and the accompanying drawings.

It goes without saying that the features mentioned above and those to still be explained below can be used not only in the combination specified in each case but also in other combinations or in isolation without departing from the scope of the present invention.

DETAILED DESCRIPTION

Figure 1A:
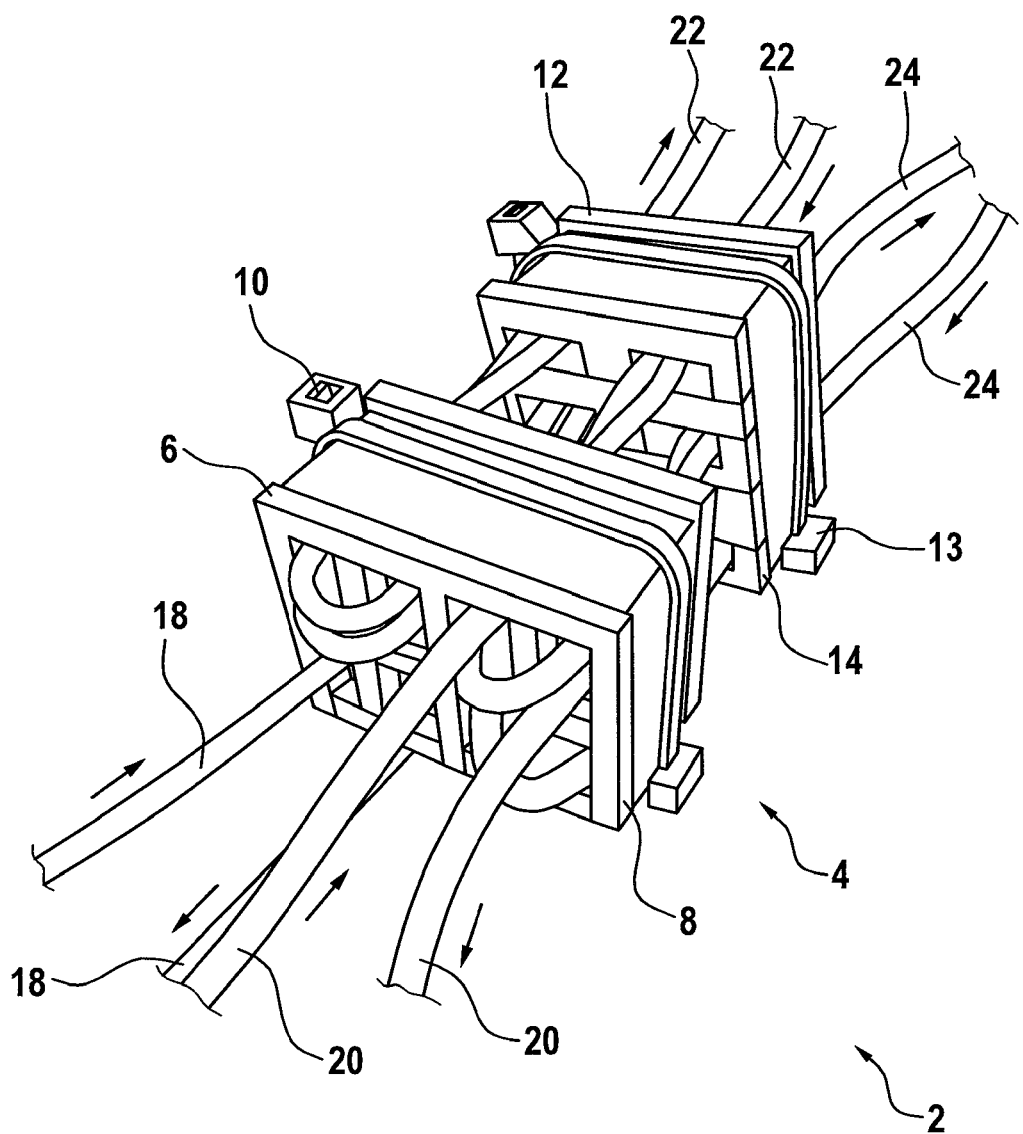
FIG. 1 shows in schematic depiction a first embodiment of the coupling device for a first embodiment of the multi-phase converter from different perspectives.

The invention is schematically depicted with the aid of embodiments in the drawings and is described below in detail with reference to the drawings.

The figures are described coherently and comprehensively. Identical reference signs denote identical components.

The first embodiment of the multi-phase converter, which is designed here as a four-phase converter and is schematically depicted in FIG. 1, comprises a coupling device 4 for four phases which have electrical voltages. The voltage of a phase and a current which flows through the phase can vary for a phase. Thus, the voltage of a phase can be a DC voltage with a superimposed AC component which can be a few percent of a value of the DC voltage. The voltage of a phase can be embodied as a clocked DC voltage.

The coupling device 4 thereby comprises a first and a second coupling module 6, 8 which can be magnetically decoupled from one another and consequently do not have to be magnetically coupled to one another. In addition, the coupling device 4 comprises a third and a fourth coupling module 12, 14 which likewise can be magnetically decoupled from one another and consequently do not have to be magnetically connected to one another.

In addition, FIG. 1 shows two bands 10, 13 by means of which coupling modules 6 and 8 or 12 and 14 are connected as well as closed as magnetic circuits. As an alternative to the bands 10, 13, the coupling modules 6, 8, 12, 14 can also be closed by means of adhesive bonding or by means of spring action.

The coupling device 4 further comprises a first plastic coated conductor loop 18 for a first phase, a second plastic coated conductor loop 20 for a second phase, a third plastic coated conductor loop 22 for a third phase and a fourth plastic coated conductor loop 24 for a fourth phase. Instead of a plastic coating, all other types of coatings for insulating the conductor loops 18, 20, 22, 24 can be used in order to suppress an electrically conductive connection between the conductor loops 18, 20, 22, 24 themselves and to a ferrite core of a coupling module 6, 8, 12, 14.

Figure 1B:
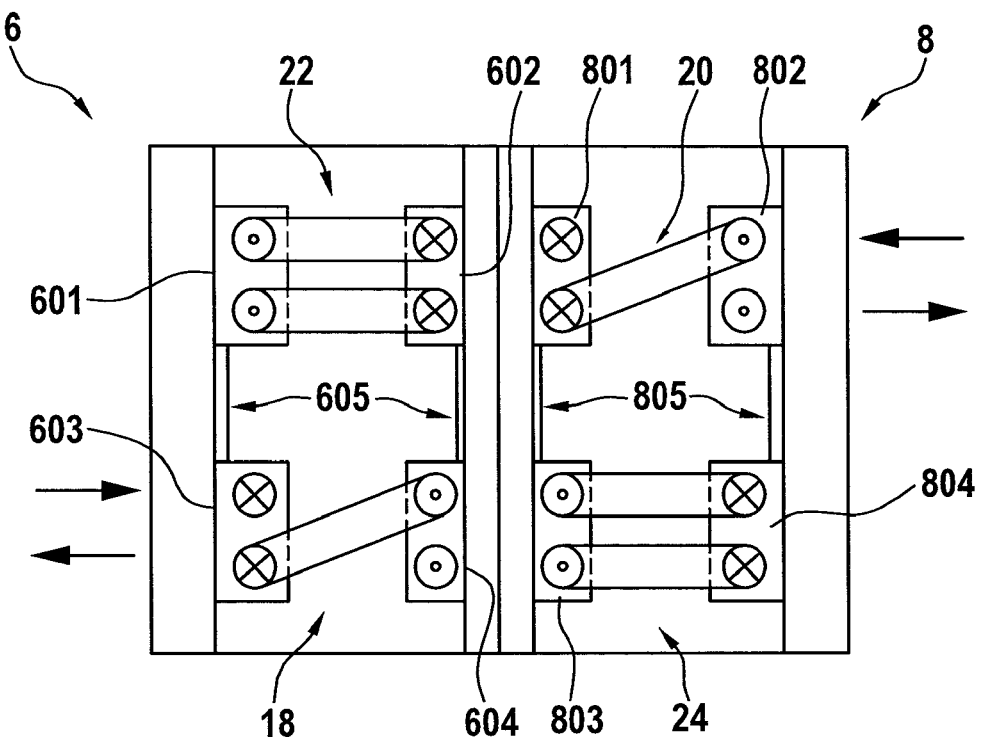
Figure 1C:
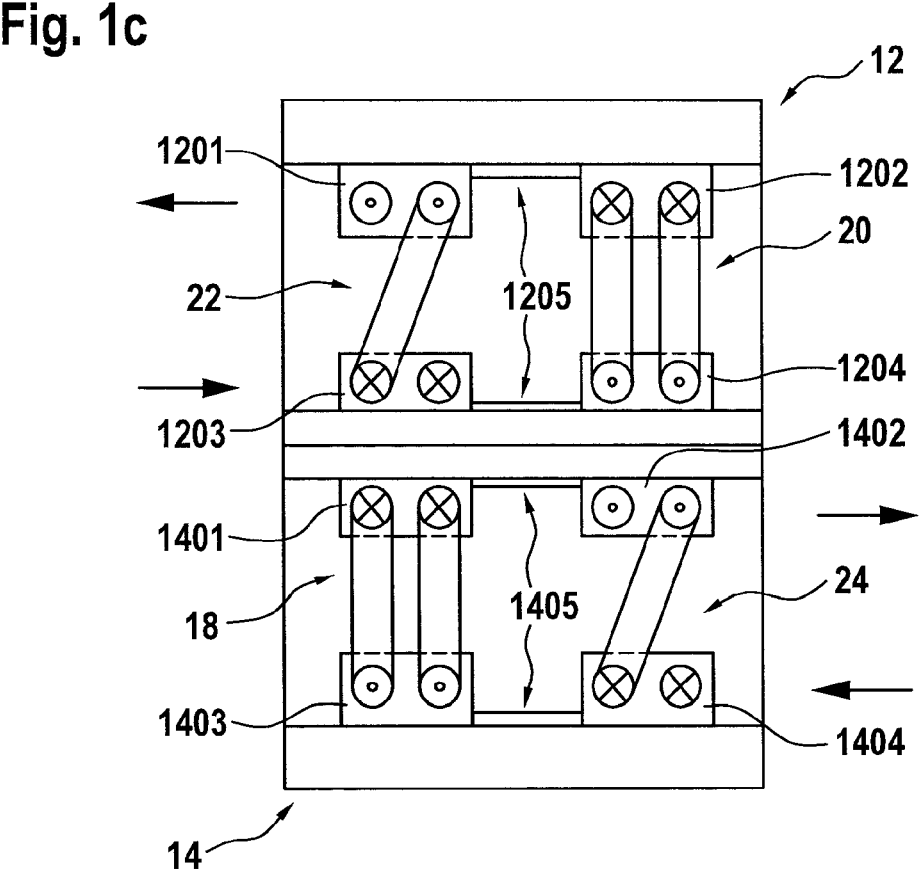
Figure 1D:
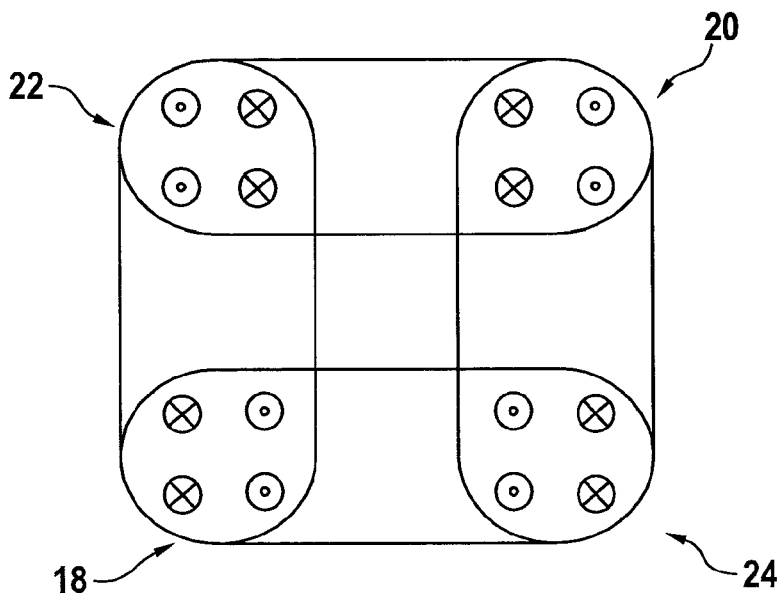

The coupling device 4 is depicted from the side in FIG. 1a. FIG. 1b shows the first and the second coupling module 6, 8 from the front, i.e. from above. FIG. 1c shows the third and fourth coupling module 12, 14 from below and thus from the rear. Rear sides of the first and second coupling module 6, 8 thus face front sides of the third and fourth coupling module 12, 14. In FIG. 1d, a transition and therefore a coupling of the phases flowing through the four conductor loops 18, 20, 22, 24 is depicted on the one hand between the first and second coupling module 6, 8 and on the other hand between the third and fourth coupling module 12, 14, when viewed from the direction of the front side.

Directions in which the phases flow through the conductor loops 18, 20, 22, 24 of the coupling device 4 during operation of the multi-phase converter 2 are indicated by arrows along the conductor loops 18, 20, 22, 24. In addition, encircled crosses in FIGS. 1b, 1c, and 1d indicate where the phases to be transported flow through sections of conductor loops 18, 20, 22, 24 into the plane of the drawing. The encircled dots indicate where the phases to be transported flow through sections of conductor loops 18, 20, 22, 24 out of the plane of the drawing. Directions for currents of the phases can also thereby be exchanged. In this case, crosses can be exchanged with dots and dots with crosses in FIG. 1 as well as in the depiction of the further FIGS. 2 to 4. Irrespective of concrete current directions of phases which flow through the conductor loops 18, 20, 22, 24, said current directions are opposite one another and cancel each other out in each main circuit of a coupling module 6, 8, 12, 14.

The first coupling module 6 further comprises a first through-hole 601, a second through-hole 602, a third through-hole 603 and a fourth through-hole 604, wherein the first and the third through-hole 601, 603 as well as the second and the fourth through-hole 602, 604 are in this case connected via a slot 605 to one another. The second coupling module 8 comprises a first through-hole 801, a second through-hole 802, a third through-hole 803 and a fourth through-hole 804, wherein the first and the third through-hole 801, 803 as well as the second and the fourth through-hole 802, 804 can be connected here respectively via a slot 805, which is designed as an air gap. Provision is made in this case for the first and the second coupling module 6, 8 to form a first plane of the coupling device 4, wherein a total of eight through-holes 601, 602, 603, 604, 801, 802, 803, 804 are directed substantially perpendicularly through the second plane so as to be oriented parallel to one another.

Longitudinal axes of the third and the fourth coupling module 12, 14 are rotated by 90 degrees with respect to longitudinal axes of the first and second coupling module 6, 8. The third coupling module 12 has a first through-hole 1201, and second through-hole 1202, a third through-hole 1203 and a fourth through-hole 1204, wherein the first and the second through-hole 1201, 1202 as well as the third and the fourth through-hole 1203, 1204 are connected here respectively via a slot 1205 to one another. The fourth coupling module 14 comprises a first through-hole 1401, a second through-hole 1402 a third through-hole 1403 and a fourth through-hole 1404, wherein the first and second through-hole 1401, 1402 as well as the third and the fourth through-hole 1403, 1404 are connected here respectively via a slot 1405 to one another. A second plane of the coupling device 4 is formed by the third and fourth coupling module 12, 14, wherein a total of eight through-holes 1201, 1202, 1203, 1204, 1401, 1402, 1403, 1404 are directed substantially perpendicularly through the second plane so as to be oriented parallel to one another.

Each slot 605, 805, 1205, 1405 between the respective through-holes 601, 602, 603, 604, 801, 802, 803, 804, 1201, 1202, 1203, 1204, 1401, 1402, 1403, 1404 is provided by grinding an air gap having a thickness in the range of approximately 0.1 to 2 mm, whereby a high magnetic resistance is produced for the leakage flux of the individual phases. By means of a suitable selection of a slot 605, 805, 1205, 1405 that is configured as an air gap and has a small width and a leakage flow resulting therefrom, the behavior with regard to an electromagnetic compatibility can be improved. In so doing, core material of the components of a coupling module 6, 8, 12, 14 must be prevented from becoming saturated by the leakage flux resulting when a certain current level flowing through the phases is reached. Depending on the requirements of the respective application, it is thereby possible to strike a balance between a behavior of the electromagnetic compatibility and an efficiency of the multi-phase converter 2.

In addition, it is possible to reduce a magnetic cross-sectional area of the core material in the region of a slot 605, 805, 1205, 1405. As a result, provision can be made starting at a certain load (overload) of the multi-phase converter 2 for only a region of the leakage flux along a leakage path to be saturated due to the reduced cross-sectional area of a slot 605, 805, 1205, 1405. A main path for a main magnetic flux of a coupling module 6, 8, 12, 14 remains thereby unaffected. In the case of an overload, only the electromagnetic compatibility of the multi-phase converter 2 will then be negatively impacted. In contrast to conventional uncoupled converters, a main path of a coupling module 6, 8, 12, 14 will not reach saturation, whereby the destruction or malfunction of the converter can be prevented.

In addition, individual slots 605, 805, 1205, 1405 of a coupling module 6, 8, 12, 14 can be adhesively bonded to one another for the purpose of providing adhesive gaps. Such adhesive gaps can be arranged at certain distances from one another. In so doing, slots 605, 805, 1205, 1405 can be alternately designed as air gaps and adhesive gaps. To this end, an adhesive can be filled into a slot 605, 805, 1205, 1405 that is to be designed as an adhesive gap or a film can be glued into said slot. As a result the inductance of a phase is reduced. Values for inductances that are greater than 50 µH and can be achieved with an air gap instead of an adhesive gap, are not necessary for the operation of the multi-phase converter. A reduction of the inductance of the phases to values of, e.g., 10 to 20 µH is still sufficient for an EMC-optimized operation. This leads to a robust behavior of the multi-phase converter 2 and therefore to a more cost effective total concept.

The first phase through the first conductor loop 18 is guided through the coupling device 4 as follows:
through the front face of the first coupling module 6 into the third through-hole and out the back side,
through the front face of the fourth coupling module 14 into the third through-hole 1403 and out the back side,
through the back side of the fourth coupling module 14 into the first through-hole 1401 and out the front face,
through the back side of the first coupling module 6 into the fourth through-hole 604 and out the front face,
through the front face of the first coupling module 6 again into the third through-hole 603 and out the back side,
through the front face of the fourth coupling module 14 into the third through-hole 1403 and out the back side,
through the back side of the fourth coupling module 14 into the first through-hole 1401 and out the front face,
through the back side of the first coupling module 6 into the fourth through-hole 604 and out the front face.

It therefore follows that the first phase to be transported through the first conductor loop 18 penetrates the third and fourth through-hole 603, 604 of the first coupling module 6 as well as the first and third through-hole 1401, 1403 of the fourth coupling module 14, wherein the first phase penetrates each of these four through-holes 603, 604, 1401, 1403 twice in the same direction. Furthermore, the first phase penetrates the third through-hole 603 of the first coupling module 6 twice in a first direction through the front face and through the fourth through-hole 604 of the first coupling module 6 twice in a second direction through the back side which is opposite to the first direction. In addition, the first phase penetrates the third through-hole 1403 of the fourth coupling module 14 twice in the first direction through the front face and penetrates the first through-hole 1401 of the fourth coupling module 14 twice in the second, opposite direction through the back side.

In order to transport the second phase, provision is made for the following feed through the second conductor loop of the coupling device 4:
through the front face of the second coupling module 8 into the first through-hole 801 and out the back side,
through the front face of the third coupling module 12 into the fourth through-hole 1204 and out the back side,
through the back side of the third coupling module 12 into the second through-hole 1202 and out the front face,
through the back side of the second coupling module 8 into the second through-hole 802 and out the front face,
through the front face of the second coupling module 8 into the first through-hole 801 and out the back side,
through the front face of the third coupling module 12 into the fourth through-hole 1204 and out the back side,
through the back side of the third coupling module 12 into the second through-hole 1202 and out the front face, through the back side of the second coupling module 8 into the second through-hole 802 and out the front face.

It therefore follows that the second phase to be transported through the second conductor loop 20 penetrates the first and second through-hole 801, 802 of the second coupling module 8 as well as the second and fourth through-hole 1202, 1204 of the third coupling module 12, wherein the second phase penetrates each of these four through-holes 801, 802, 1202, 1204 twice in the same direction. Furthermore, the second phase penetrates through the first through-hole 801 of the second coupling module 8 twice in a first direction through the front face and through the second through-hole 802 of the second coupling module 8 twice through the back side in a second direction which is opposite the first direction. In addition, the second phase penetrates the second through-hole 1202 of the third coupling module 14 twice in the second direction and through the fourth through-hole 1204 of the third coupling module 12 twice in the first direction.

A direction for the transport of the third phase by means of the conductor loop 22 is oriented as described below:
through the back side of the third coupling module 12 into the third through-hole 1203 and out the front face,
through the back side of the first coupling module 6 into the first through-hole 601 and out the front face,
through the front face of the first coupling module 6 into the second through-hole 602 and out the back side,
through the front face of the third coupling module 12 into the first through-hole 1201 and out the back side,
through the back side of the third coupling module 12 into the third through-hole 1203 and out the front face,
through the back side of the first coupling module 6 into the first through-hole 601 and out the front face,
through the front face of the first coupling module 6 into the second through-hole 602 and through the back side,
through the front face of the third coupling module 12 into the first through-hole 1201 and out the back side.

It therefore follows that the third phase to be transported through the third conductor loop 22 penetrates respectively twice the first and second through-hole 601, 602 of the first coupling module 6 as well as the first and third through-hole 1201, 1203 of the third coupling module 12, whereby the third phase penetrates each of these four through-holes 601, 602, 1201, 1203 twice in the same direction. In detail, the third phase penetrates the second through-hole 602 of the first coupling module 6 as well as the first through-hole 1201 of the third coupling module 12 in the first direction through the front face, whereas the third phase penetrates the first through-hole 601 of the first coupling module 6 as well as the third through-hole 1203 of the third coupling module 12 in a direction opposite the first direction in each case through the back side.

In order to transport the fourth phase through the fourth conductor loop 24, the following feed through the coupling device 4 applies:
through the back side of the fourth coupling module 14 into the fourth through-hole 1404 and out the front face,
through the back side of the second coupling module 8 into the third through-hole 803 and out the front face,
through the front face of the second coupling module 8 into the fourth through-hole 804 and out the back side,
through the front face of the fourth coupling module 14 into second through-hole 1402 and out the back side,
through the back side of the fourth coupling module 14 into the fourth through-hole 1404 and out the front face,
through the back side of the second coupling module 8 into the third through-hole 803 and out the front face,
through the front face of the second coupling module 8 into the fourth through-hole 804 and out the back side,
through the front face of the fourth coupling module 12 into the second through-hole 1402 and out the back side.

In summary, the fourth phase to be transported through the fourth conductor loop 24 penetrates the third and fourth through-hole 803, 804 of the second coupling module 8 as well as the second and fourth through-hole 1402, 1404 of the fourth coupling module 14 in each case twice in the same direction. In so doing, the fourth phase penetrates the fourth through-hole 804 of the second coupling module 8 and the second through-hole 1402 of the fourth coupling module 14 in the first direction through the front face of the respective coupling module 14. In contrast thereto, the fourth phase penetrates the third through-hole 803 of the second coupling module 8 and the fourth through-hole 1404 of the fourth coupling module 14 via the back side in the second direction which is opposite the first direction.

Each conductor loop 18, 20, 22, 24 in each case twice penetrates the through-holes 601, 602, 603, 604, 801, 802, 803, 804, 1201, 1202, 1203, 1204, 1401, 1402, 1403, 1404 from two of the four coupling modules 6, 8, 12, 14. Thus, only sections of two conductor loops 18, 20, 22, 24 penetrate a total of four through-holes 601, 602, 603, 604, 801, 802, 803, 804, 1201, 1202, 1203, 1204, 1401, 1402, 1403, 1404 of a coupling module 6, 8, 12, 14, namely 6 sections of the first and third conductor loop 18, 22 penetrate through-holes 601, 602, 603, 604, 8 sections of the second and fourth conductor loop 20, 24 penetrate through-holes 801, 802, 803, 804 of the second coupling module 8, 12 sections of the second and third conductor loop 20, 22 penetrate through-holes 1201, 1202, 1203, 1204 and 14 sections of the first and fourth conductor loop 18, 24 penetrate through-holes 1401, 1402, 1403, 1404 of the fourth coupling module 14. In addition, a first plane of the coupling device 4 comprises the first and the second coupling module 6, 8 (FIG. 1b). A second plane of the coupling device 4 comprises the third and the fourth coupling module 12, 14 (FIG. 1c). In this way, each phase to be transported through a conductor loop 18, 20, 22, 24 penetrates each plane a total of four times, twice in the first direction and twice in the second direction.

Provision is made for the multi-phase converter 2 to be designed as a voltage converter. During one operation of the multi-phase converter, the four phases flow through the through-holes 601, 602, 603, 604, 801, 802, 803, 804, 1201, 1202, 1203, 1204, 1401, 1402, 1403, 1404 of the four coupling modules 6, 8, 12, 14 in accordance with the previously described sequences and directions.

A phase to be transported through the conductor loop 18, 20, 22, 24 penetrates a through-hole 601, 602, 603, 604, 801, 802, 803, 804, 1201, 1202, 1203, 1204, 1401, 1402, 1403, 1404 of a coupling module 6, 8, 12, 14 in a plane twice in the first direction and an adjacent through-hole 601, 602, 603, 604, 801, 802, 803, 804, 1201, 1202, 1203, 1204, 1401, 1402, 1403, 1404 twice in the second direction, wherein the phases to be transported through the conductor loops 18, 20, 22, 24 flow through a through-hole 601, 602, 603, 604, 801, 802, 803, 804, 1201, 1202, 1203, 1204, 1401, 1402, 1403, 1404 in the same direction in which a section of a conductor loop 18, 20, 22, 24 penetrates the respective through-hole 601, 602, 603, 604, 801, 802, 803, 804, 1201, 1202, 1203, 1204, 1401, 1402, 1403, 1404. Each phase is therefore coupled in a first plane with the preceding phase thereof as well as in a second plane with the succeeding phase thereof. This results in a magnetic coupling with two phases taking place in two planes.

In FIG. 2, a second embodiment of the coupling device 30 for the second embodiment of the multi-phase converter 32 designed as a four-phase converter is schematically depicted. Said coupling device 30 comprises four coupling modules 34, 36, 38, 40.

Figure 2A:
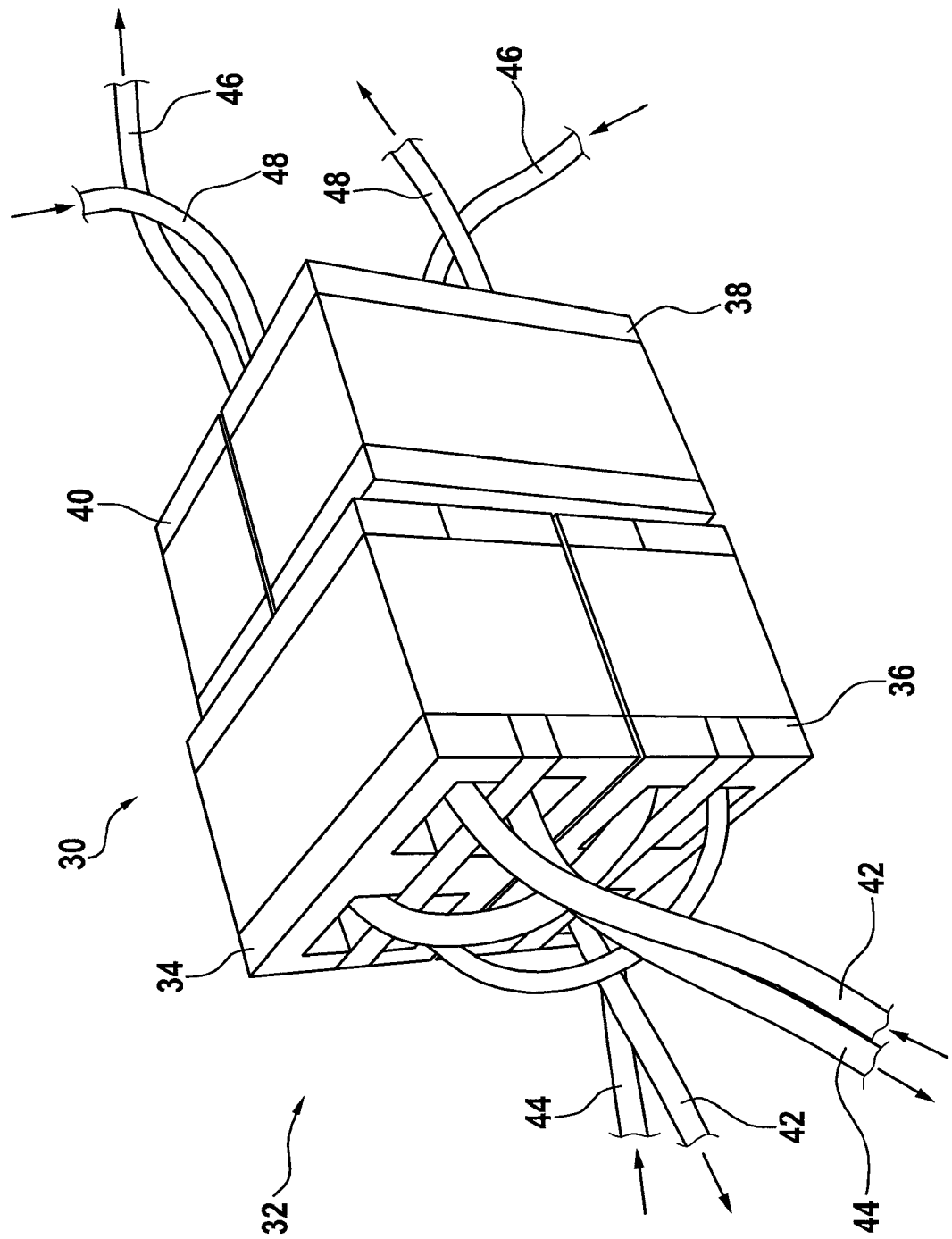
FIG. 2 shows in schematic depiction a second embodiment of the coupling device for a second embodiment of the multi-phase converter from different perspectives.

In doing so, FIG. 2a shows the coupling device 30 from the side, wherein a first and a second coupling module 34, 36 are disposed on a front side of the coupling device 30 and are depicted from the front. A third and a fourth coupling module 38, 40 are shown disposed behind the first and the second coupling module 34, 36 in the perspective view of FIG. 2a.

Figure 2B:
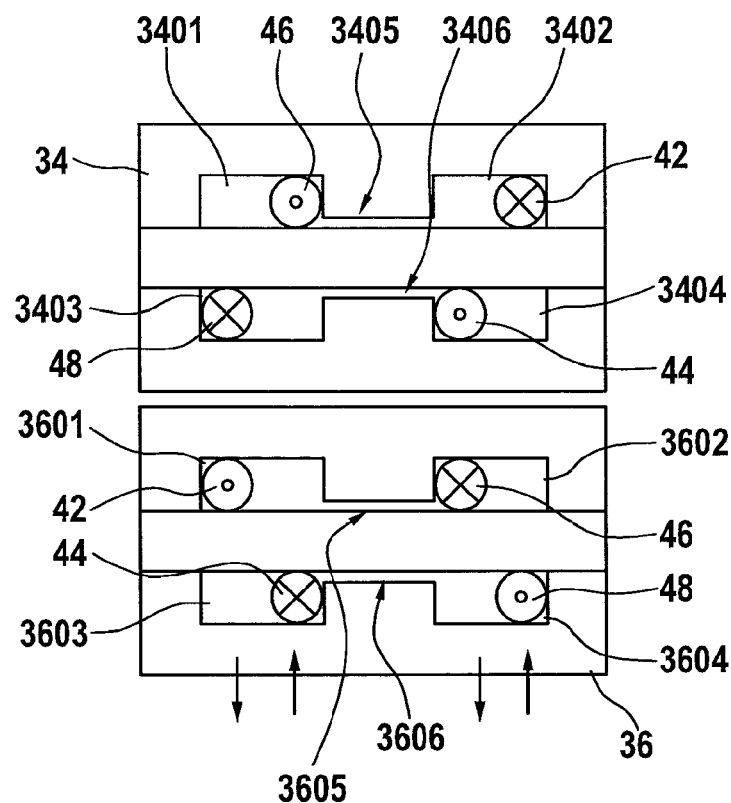
Figure 2C:
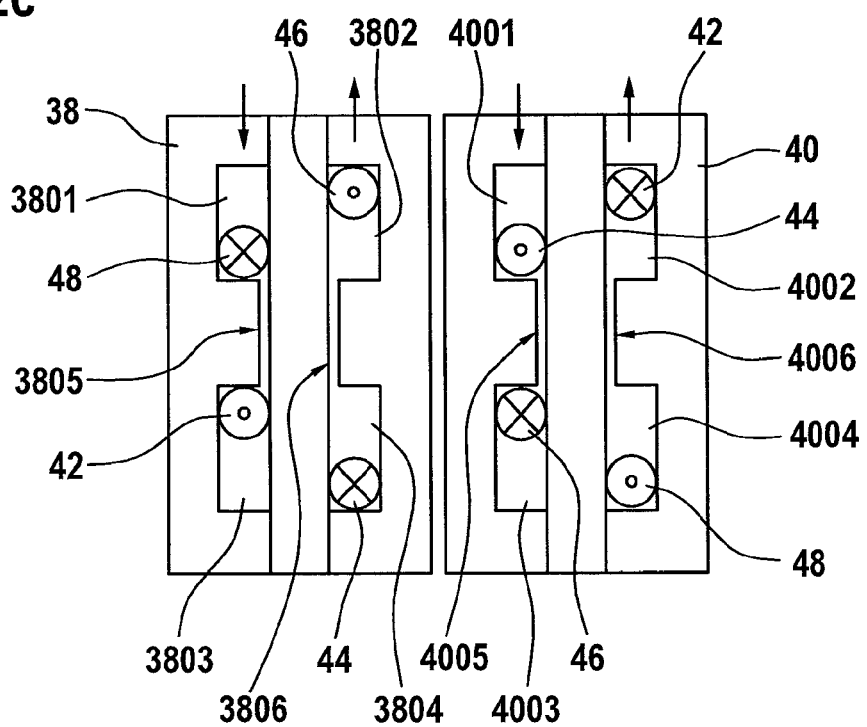

Similarly to the depiction in FIG. 2a, the first and the second coupling module 34, 36 are depicted from the front in FIG. 2b; thus enabling FIG. 2b to show the coupling device 30 as well as the first and second coupling module 34, 36 from a front side. FIG. 2c likewise shows the third and fourth coupling module 38, 40 of the coupling module 30 from the front. As a result, rear sides of the first and second coupling module 34, 36 face front sides of the third and fourth coupling module 38, 40 in FIG. 2a. The coupling modules 34, 36, 38, 40 depicted in FIGS. 2b and 2c are depicted from the same direction, namely from the front.

As shown in detail, the first coupling module 34 comprises a first through-hole 3401 and a second through-hole 3402 which are connected here to one another via a slot 3405. A third through-hole 3403 and fourth through-hole 3404 of the first coupling module are likewise connected to one another via a slot 3406. The second coupling module 36 has likewise four through-holes 3601, 3602, 3603, 3604, wherein a first and a second through-hole 3601, 3602 as well as a third and a fourth through-hole 3603, 3604 are likewise connected here in each case to one another via a slot 3605, 3606. Leakage fluxes of phases which flow through conductor loops 42, 44, 46, 48, which are, in this case, to penetrate through-holes 3401, 3402, 3403, 3404, 3601, 3602, 3603, 3604, are to be affected inter alia by a dimensioning of the slots 3405, 3406, 3605, 3606.

The third coupling module 38 has four through-holes 3801, 3802, 3803, 3804, wherein the first and the third through-hole 3801, 3803 as well as the second and the fourth through-hole 3802, 3804 are in each case connected to one another via a slot 3805, 3806. Furthermore, a first through-hole 4001 and a third through-hole 4003 of the fourth coupling module 40 are connected to one another via a slot 4005. The same applies to a second and a fourth through-hole 4002, 4004 of the fourth coupling module 40, which are likewise connected here to one another via a slot 4006. Via the dimensions of said slots 4005, 4006, a leakage flux can be adjusted for each conductor loop 42, 44, 46, 48 which, in this case, penetrates a through-hole 3801, 3802, 3804, 4001, 4002, 4003, 4004.

In the present embodiment, each coupling module 34, 36, 38, 40 comprises three components consisting of core material, usually ferrite material. Two of these components are cuboid-shaped and have in each case two grooves disposed adjacent to one another, wherein each of said grooves is delimited on the outside by an outer limb. An inner limb is disposed between the two grooves, by means of which the two grooves are separated from one another. Each of a total of two outer limbs is thereby longer than the inner limb. As a result, these two components of a coupling module 34, 36, 38, 40 have an E-shaped profile. A third component of a coupling module 34, 36, 38, 40 is cuboid-shaped. In order to provide a coupling module 34, 36, 38, 40, the third component is to be disposed between the two E-shaped components, wherein the grooves of the two E-shaped components face each other. The grooves and the third component disposed between said grooves encompass the four through-holes 3401, 3402, 3403, 3404, 3601, 3602, 3603, 3604, 3801, 3802, 3803, 3804, 4001, 4002, 4003, 4004 of a coupling module 34, 36, 38, 40.

Because the middle limb of an E-shaped component is shorter than the two outer limbs, the slot 3405, 3406, 3605, 3606, 3805, 3806, 4005, 4006, which connects two through-holes 3401, 3402, 3403, 3404, 3601, 3602, 3603, 3604, 3801, 3802, 3803, 3804, 4001, 4002, 4003, 4004 to one another, is disposed in each case between the two through-holes 3401, 3402, 3403, 3404, 3601, 3602, 3603, 3604, 3801, 3802, 3803, 3804, 4001, 4002, 4003, 4004. A magnetic resistance of a leakage flux of the individual phases is adjusted by means of a width or thickness of the slots 3405, 3406, 3605, 3606, 3805, 3806, 4005, 4006 between respectively two through-holes 3401, 3402, 3403, 3404, 3601, 3602, 3603, 3604, 3801, 3802, 3803, 3804, 4001, 4002, 4003, 4004 of, for example, 0.1 to 0.2 mm, whereby an electromagnetic compatibility can be adjusted. The outer limbs of a component are connected to the third, cuboid-shaped component by means of adhesive bonding.

It is possible that the coupling modules 6, 8, 12, 14 of the first embodiment of the coupling device 4 from FIG. 1 are designed exactly as the coupling modules 34, 36, 38, 40 of the second embodiment of the coupling device 30.

In addition, FIG. 2 shows sections of four coupling loops 42, 44, 46, 48 through which four phases having an intended voltage are to be transported during an operation of the multi-phase converter. In this connection, a first conductor loop 42 is provided for a first phase, a second conductor loop 44 for a second phase, a third conductor loop 46 for a third phase and a fourth conductor loop 48 for a fourth face. Each conductor loop 42, 44, 46, 48 comprises at least one wire made from metal which can be coated with an insulation consisting of plastic and/or lacquer.

Directions in which the phases flow through sections of the conductor loops 42, 44, 46, 48 as well as through the coupling device 30 during an operation of said coupling device 30 are indicated by arrows in FIG. 2a. In FIGS. 2b and 2c, the encircled crosses furthermore indicate through which sections of conductor loops 42, 44, 46, 48 the phases to be transported flow into the plane of the drawing. Encircled dots indicate through which sections of conductor loops 42, 44, 46, 48 the phases to be transported flow out of the plane of the drawing. As is shown in FIGS. 2a and 2c, provision is made when manufacturing the multi-phase converter 32 to insert each conductor loop 42, 44, 46, 48 through successively aligned through-holes 601, 602, 603, 604, 801, 802, 803, 804, 1201, 1202, 1203, 1204, 1401, 1402, 1403, 1404 of two successively disposed coupling modules 34, 36, 38, 40.

A first phase through the first conductor loop 42 is guided through the coupling device 30 in the following manner:
through the front face of the first coupling module 34 into the second through-hole 3402 and out the back side,
through the front face of the fourth coupling module 40 into the second through-hole 4002 and out the back side,
through the back side of the third coupling module 38 into the third through-hole 3803 and out the front face,
through the back side of the second coupling module 36 into the first through-hole 3601 and out the front face.

The second phase to be transported through the second conductor loop 44 flows through the coupling device 30 in the following manner:

through the front face of the second coupling module 36 into the third through-hole 3603 and out the back side,
through the front face of the third coupling module 39 into the fourth through-hole 3804 and out the back side,
through the back side of the fourth coupling module 40 into the first through-hole 4001 and out the front face,
through the back side of the first coupling module 34 into the fourth through-hole 3404 and out the front face.

The following guidance through the coupling device 30 applies to the third phase to be transported through the conductor loop 46:
through the back side of the third coupling module 38 into the second through-hole 3802 and out the front face,
through the back side of the first coupling module 34 into the first through-hole 3401 and out the front face,
through the front face of the second coupling module 36 into the second through-hole 3602 and out the back side,
through the backside of the fourth coupling module 40 into the third through-hole 4003 and out the front face.

In addition, the fourth phase, which is to be transported through the fourth conductor loop 48, is guided through the coupling device 30 as described below:
through the back side of the fourth coupling module 40 into the fourth through-hole 4004 and out the front face,
through the back side of the second coupling module 36 into the fourth through-hole 3604 and out the front face,
through the front face of the first coupling module 34 into the third through-hole 3403 and out the back side,
through the front face of the third coupling module 38 into the first through-hole 3801 and out the back side.

It therefore follows that each phase as well as each conductor loop 42, 44, 46, 48 is guided once through each coupling module 34, 36, 38, 40. Only one section of a conductor loop 42, 44, 46, 48 penetrates each through-hole 3403, 3402, 3403, 3404, 3601, 3602, 3603, 3604, 3801, 3802, 3802, 3804, 4001, 4002, 4003, 4004 of all of the coupling modules 34, 36, 38, 40. Provision is made for a first plane of the coupling device 30 to comprise the first and second coupling module 34, 36, the through-holes of which 3403, 3402, 3403, 3404, 3601, 3602, 3603, 3604 are disposed parallel and adjacent to one another. A second plane, which is disposed behind the first plane, comprises the third and fourth coupling module 38, 40, the through-holes of which 3801, 3802, 3802, 3804, 4001, 4002, 4003, 4004 are disposed parallel and adjacent to one another. Each conductor loop 42, 44, 46, 48 is guided twice through each of the two planes, namely in a first and a second direction which is directed oppositely to the first direction.

During an operation of the multi-phase converter 32, the phases flow through the through-holes 3401, 3402, 3403, 3404, 3601, 3601, 3603, 3604, 3801, 3802, 3802, 3804, 4001, 4002, 4003, 4004 that are provided for them in those directions in which the sections of the conductor loops 42, 44, 46, 48, as described, penetrate the through-holes, 3401, 3402, 3403, 3404, 3601, 3601, 3603, 3604, 3801, 3802, 3802, 3804, 4001, 4002, 4003, 4004. Each phase in the operation of the multi-phase converter 32 is thereby guided twice through each plane, namely in the first and the second, oppositely directed direction, wherein the flowing phases are coupled to one another.

A third embodiment of the coupling device 60 for the third embodiment of the multi-phase converter 62 which is designed here as a four-phase converter is schematically depicted in FIG. 3, wherein the coupling device 60 comprises four coupling modules 64, 66, 68, 70.

Figure 3A:
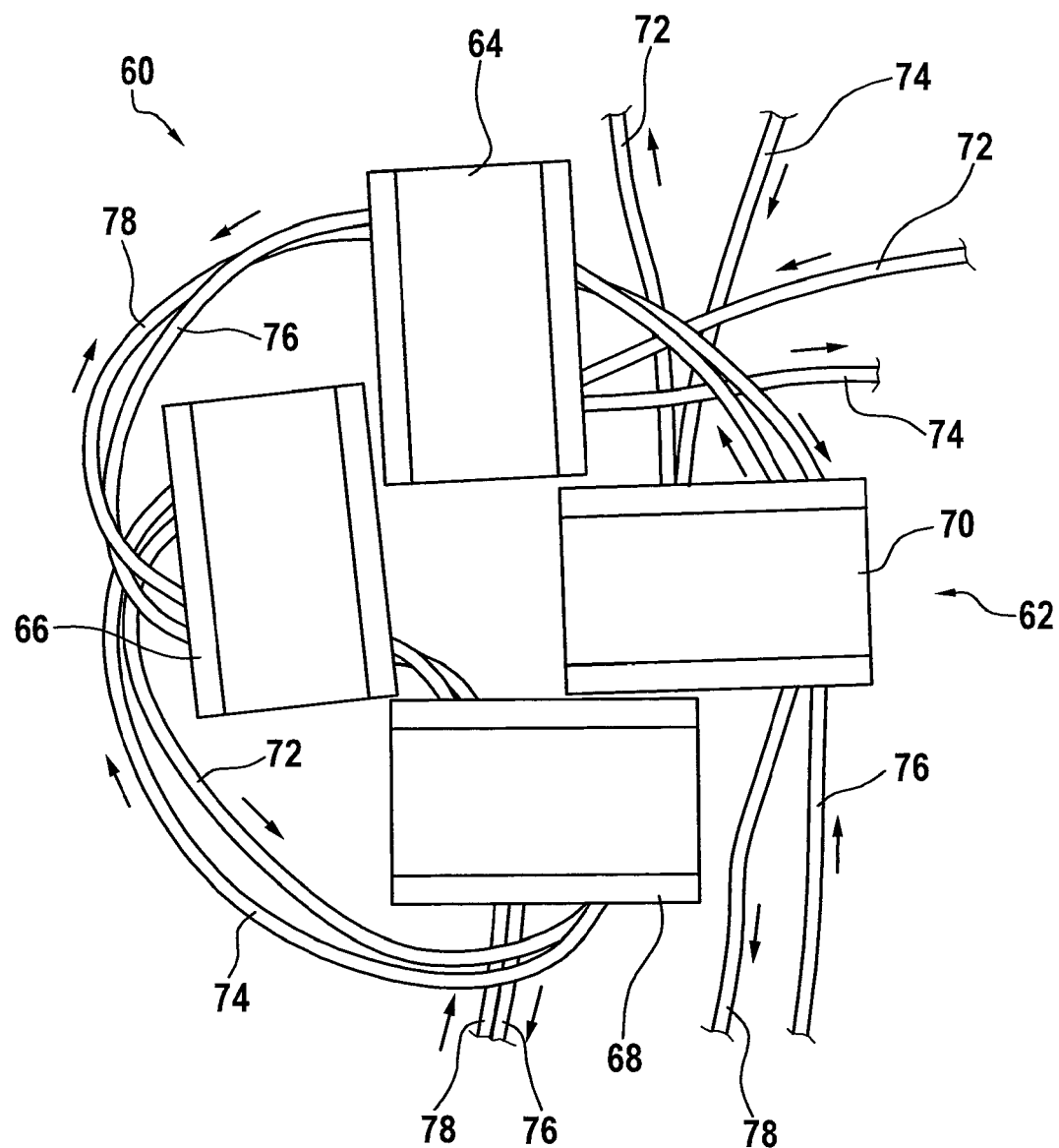
FIG. 3 shows in schematic depiction a third embodiment of the coupling device for a third embodiment of the multi-phase converter from different perspectives.
Figure 3B:
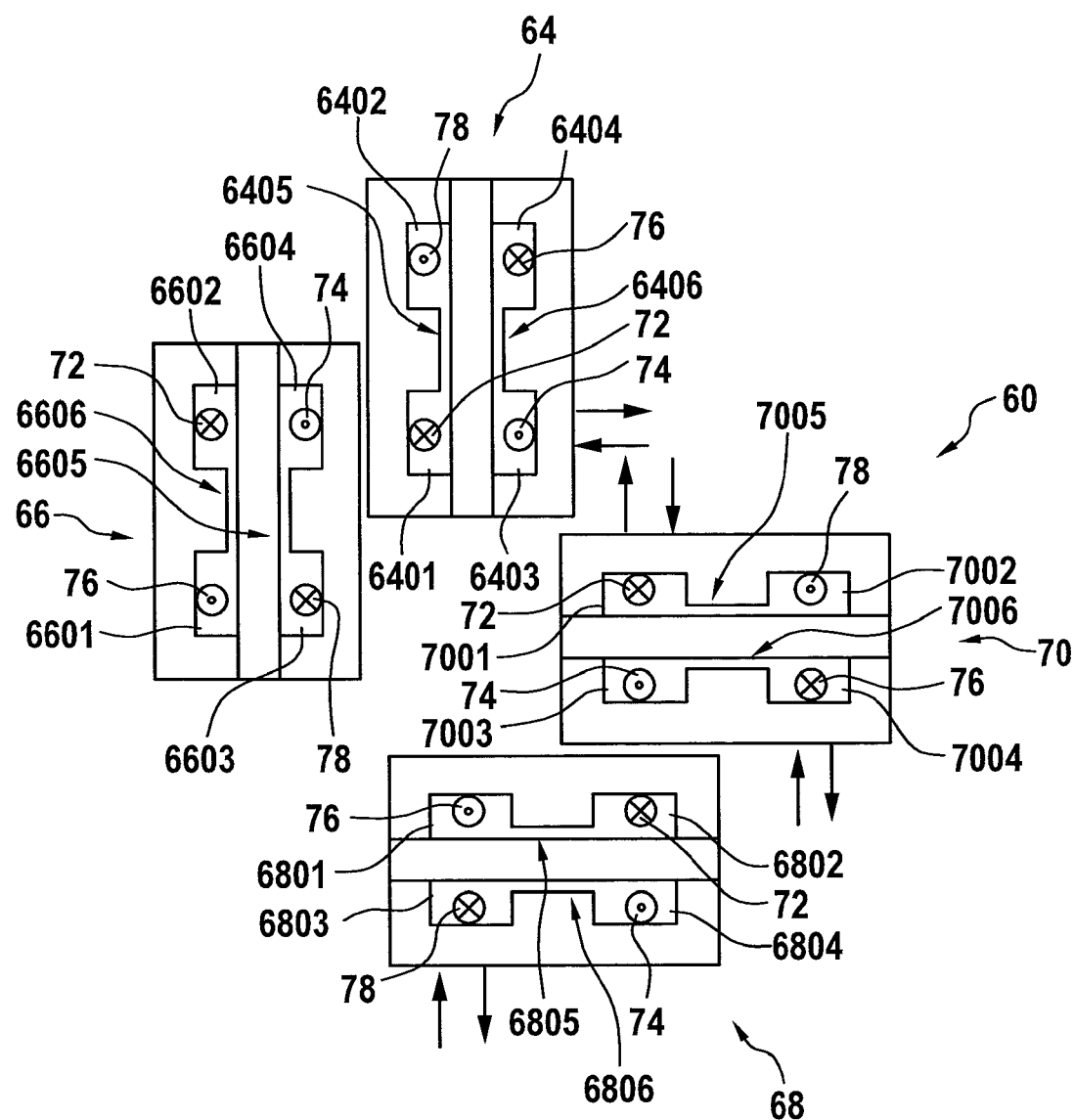

FIG. 3a shows the coupling device 60 from above. FIG. 3b show the four coupling modules 64, 66, 68 70 according to the spatial arrangement shown in FIG. 3a, wherein each coupling module 64, 66, 68, 70 is shown here from a front face and therefore from the front, wherein the respectively four through-holes 6401, 6402, 6403, 6404, 6601, 6602, 6603, 6604, 6801, 6802, 6803, 6804, 7001, 7002, 7003, 7004 of a coupling module 64, 66, 68, 70 can be seen. Both FIGS. 3a and 3b show a counter-clockwise arrangement consisting of a first coupling module 64 at the top, a second coupling module 66 on the left, a third coupling module 68 at the bottom and a fourth coupling module 70 on the right.

The four coupling modules 64, 66, 68, 70 are constructed and therefore designed similarly to those coupling modules 34, 36, 38, 40 of the second embodiment of the coupling device 30 which were already presented with the aid of FIG. 2. In this regard, each coupling module 64, 66, 68, 70, as viewed from the front, has a first through-hole 6401, 6601, 6801, 7001 at the top left, a second through-hole 6402, 6602, 6802, 7002 at the top right, a third through-hole 6403, 6603, 6803, 7003 at the lower left and a fourth through-hole 6404, 6604, 6804, 7004 at the lower right. In the first coupling module 64, the first and the second through-hole 6401, 6402 are thereby connected to one another via a first slot 6405 as well as the third and the fourth through-hole 6403, 6404 via a second slot 6406. The same applies to the second coupling module 66 in which the first and the second through-hole 6601, 6602 are connected to one another via a first slot 6605 as well the third and the fourth through-hole 6603, 6604 via a second slot 6606. In the third coupling module 68, the first and the second through-hole 6801, 6802 are connected to one another via a first slot 6805. The third and the fourth through-hole 6803, 6804 are connected here to one another via a second slot 6806. In the fourth coupling module 70, provision is made for a first slot 7005 for connecting the first and the second through-hole 7001, 7002 as well as a second slot 7006 for connecting the third and the fourth through-hole 7003, 7004.

In addition, FIG. 3 shows sections of four conductor loops 72, 74, 76, 78, through which four phases having a voltage adjusted for this purpose are to be transported during an operation of the multi-phase converter. In this regard, a first conductor loop 72 for a first phase, a second conductor loop 74 for a second phase, a third conductor loop 76 for a third phase and a fourth conductor loop 78 for a fourth phase are provided. The conductor loops 72, 74, 76, 78 comprise in each case a wire made from metal which can be coated with plastic or lacquer.

Directions in which sections of the conductor loops 72, 74, 76, 78 penetrate the coupling device 60 and the phases are to be transported and in which the phases flow through said conductor loops 72, 74, 76, 78 are indicated in FIG. 3a by arrows. In addition, encircled crosses in FIG. 3b indicate through which sections of conductor loops 72, 74, 76, 78 the phases to be transported flow into the plane of the drawing. The encircled points indicate when phases to be transported flow through the respective section of the conductor loop 72, 74, 76, 78 out of the plane of the drawing.

Provision is made for the first phase which is to be transported through the first conductor loop 72 to be guided through the coupling device 60 in the following manner:
through the front face of the first coupling module 64 into the first through-hole 6401 and out the back side,
through the front face of the second coupling module 66 into the second through-hole 6602 and out the back side, through the front face of the third coupling module 68 into the second through-hole 6802 and out the back side, through the front side of the fourth coupling module 70 into the first through-hole 7001 and out the back side.

The second phase to be transported through the second conductor loop 74 is guided through the coupling device 60 in the following manner:
through the back side of the fourth coupling module 70 into the third through-hole 7003 and out the front face,
through the back side of the third coupling module 68 into the fourth through-hole 6804 and out the front face,
through the back side of the of the second coupling module 66 into the fourth through-hole 6604 and out the front face,
through the back side of the first coupling module 64 into the third through-hole 6403 and out the front face.

The third phase to be transported through the third conductor loop 76 is guided through the coupling device 60 in the following manner:
through the front face of the fourth coupling module 70 into the fourth through-hole 7004 and out the back side,
through the front face of the first coupling module 64 into the fourth through-hole 6404 and out the back side,
through the back side of the second coupling module 66 into the first through-hole 6601 and out the front face,
through the back side of the third coupling module 68 into the first through-hole 6801 and out the front face.

In addition, the fourth phase to be transported through the fourth conductor loop 78 is guided through the coupling device 60 as described below:
through the front face of the third coupling module 68 into the third through-hole 6803 and out the back side,
through the front face of the second coupling module 66 into the third through-hole 6603 and out the front face again,
through the back side of the first coupling module 64 into the second through-hole 6402 and out the back side again,
through the back side of the fourth coupling module 70 into the second through-hole 7002 and out the front face.

Thus, each conductor loop 72, 74, 76, 78 is guided once through each coupling module 64, 66, 68, 70. There are, however, possible embodiments in which each conductor loop 72, 74, 76, 78 can be guided through each coupling module 64, 66, 68, 70 two or a plurality of times. Only one section of a conductor loop 72, 74, 76, 78 penetrates each through-hole 6401, 6402, 6403, 6404, 6601, 6602, 6603, 6604, 6801, 6802, 6803, 6804, 7001, 7002, 7003, 7004 of all of the coupling modules 64, 66, 68, 70. In this embodiment, the coupling device comprises four planes, wherein each plane is formed by a coupling module 64, 66, 68, 70. During an operation of the multi-phase converter 62, two of the phases flow in the first direction and the two other phases in the second direction through a coupling module 64, 66, 68, 70 and therefore through a plane whereby the phases are coupled to one another A leakage flux along a leakage path, which encompasses a through-hole 6401, 6402, 6403, 6404, 6601, 6602, 6603, 6604, 6801, 6802, 6803, 6804, 7001, 7002, 7003, 7004 and a conductor loop 72, 74, 76, 78 which penetrates the through-hole 6401, 6402, 6403, 6404, 6601, 6602, 6603, 6604, 6801, 6802, 6803, 6804, 7001, 7002, 7003, is determined by a width or thickness as well as by a cross-sectional area of a slot 6405, 6406, 6605, 6606, 6805, 6806, 7005, 7006 and a low permeable material disposed therein. It is therefore possible to design a slot 6405, 6406, 6605, 6606, 6805, 6806, 7005, 7006 as an air gap without insulating material or as an adhesive gap, wherein, in the latter case, insulating material is to be glued into the slot 6405, 6406, 6605, 6606, 6805, 6806, 7005, 7006.

Figure 4:
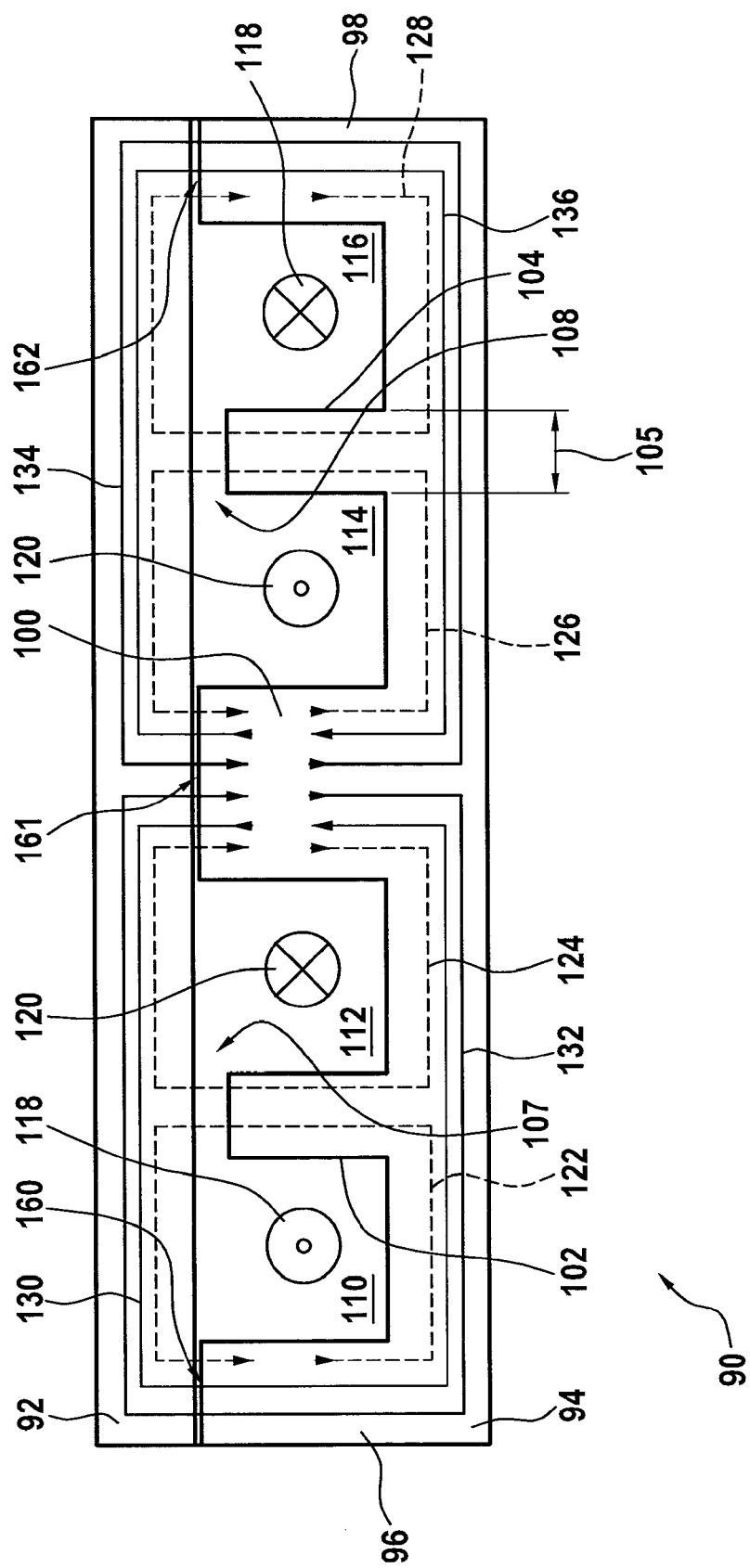
FIG. 4 shows in schematic depiction a detail of a fourth embodiment of the coupling device for a fourth embodiment of the multi-phase converter from different perspectives.

FIG. 4 shows an example for a coupling module 90 which as a component of a fourth embodiment is designed as a part of a coupling device of a fourth embodiment of a multi-phase converter. Said coupling module 90 comprises a first cuboid-shaped component 92 as well as second component 92 comprising a total of four grooves, wherein both components 92, 94 are formed from core material, typically from ferrite material. The second component 94 comprises a total of two outer long limbs 96, 98 as well as a central long limb 100 disposed in the middle. The two outer long limbs 96, 98 as well as the central long limb 100 thereby have ideally but not imperatively the same length. It is typical to embody the central limb 100 somewhat shorter than the outer limbs 96, 98, for example by grinding down said limb, and as a result to dispense with the introduction of an adhesive or films. The embodiment comprising the filled-in adhesive offers however a significantly better performance because the structure is only symmetrical if the same air gap is present in all three limbs 96, 98, 100. The central long limb 100 is furthermore wider than respectively one of the two outer long limbs 96, 98, for example as wide or having the same cross-sectional area as both outer long limbs 96, 98 together. The second component 94 furthermore comprises two short limbs 102, 104, wherein a first such short limb 102 is disposed between a first outer long limb 96 and the central long limb 100. A second short limb 104 is disposed between a second outer long limb 98 and the central long limb 100.

Respectively one of four grooves of the second component 94 is in each case delimited by a long limb 96, 98, 100 as well as by a short limb 102, 104. In order to provide the coupling module 90, the first component 92 is to be disposed on ends of the three long limbs 96, 98, 100 of the second component 94. Provision is thereby made to dispose a film and/or an adhesive between ends of the long limbs 96, 98, 100 and regions of the first component 92, against which the ends of the long limbs 96, 98, 100 come into abutment, whereby slots 160, 161, 162 designed as adhesive gaps are to be provided between the ends of the long limbs 96, 98, 100 and the first component 92. Because each of the two short limbs 102, 104 is shorter than respectively one of the three long limbs 96, 98, 100, a slot 107 designed as an air gap is provided between an end of respectively one short limb 102, 104. In addition, each short limb 102, 104 comprises a cross-sectional area, the length 105 of which is indicated here by a double area.

By joining the two components 92, 94, four through-holes 110, 112, 114, 116 of the coupling module 90 are furthermore provided. In so doing, the long limbs 96, 98, 100 of the second component 94 are connected to the first component 92 by means of adhesive bonding or clamping, wherein low permeable material is to be inserted, i.e., for example, adhesive material is to be arranged or film is to be adhesively bonded, between ends of the long limbs 96, 98, 100 and the first component 92. The two components 92, 94 are to be connected to one another by means of such an adhesive bonding or clamping, and slots 160, 161, 162, which are designed here as adhesive gaps, are to be provided between the ends of the long limbs 96, 98, 100.

A first through-hole 110 is thereby delimited by the first outer long limb 96, the first short limb 102 as well as by the first component 92. A second through-hole 112 is delimited by the first short limb 102, the central long limb 110 as well as by the second component 92. A third through-hole 114 is delimited by the central long limb 100 and a second short limb 104. A fourth through-hole 116 is delimited by the second short limb 104, the second outer long limb 98 and the second component 92. The first and the second through-hole 110, 112 are thereby connected to one another by means of the first slot 107 designed as an air gap; and the third and fourth through-hole 114, 116 are thereby connected to one another by the second slot 108 designed as an air gap. Provision is made in the embodiment presented here of a part of the coupling module 90 for a multi-phase converter for a first phase to be transported through a first conductor loop 118 to be led out of the first through-hole 110 and to be led into the fourth through-hole 116. A second phase to be transported through the second conductor loop 120 penetrates the second through-hole 112, whereas said second phase through the second conductor loop 120 is in turn led out of the third through-hole 114.

In addition, a closed leakage path 122, 124, 126, 128 is depicted for each of the sections of the two conductor loops 118, 120 shown here, wherein each leakage path 122, 124, 126, 128 encompasses a through-hole 110, 112, 114, 116 comprising a section of a conductor loop 118, 120 disposed therein. A first leakage path 122 which encompasses the first through-hole 110 thereby passes through a section of the first component 92, the slot 160 designed as an air gap and/or adhesive gap, the first outer long limb 96, a portion of the component 92, the first short limb 102 as well as the first slot 107. A second leakage path 124 encompasses the second through-hole 112 and thereby passes through a section of the first component 92, the slot 161 designed as an air gap and/or adhesive gap, the central long limb 100, a portion of the component 94, the first short limb 102 as well as the first slot 107. The third leakage path 126 encompasses the third through-hole 114 and thereby passes through a section of the first component 92, the slot 160 designed as an air gap and/or adhesive gap, the central long limb 104 as well as the second slot 108. The fourth through-hole 116 is encompassed by a fourth leakage path 128 which traverses a section of the first component 92, the slot 162 designed as an air gap and/or adhesive gap, the second outer long limb 98, a portion of the component 94, the second short limb 104 as well as the second slot 108.

Closed main paths 130, 132, 134, 136 are furthermore indicated in FIG. 4, wherein a first and a second main path 130, 132 encompass the two first through-holes 110, 112. A third and a fourth main path 134, 136 encompass respectively the third and the fourth through-hole 114, 116. The first and the second as well as the third and the fourth main path are identical with regard to the course thereof. Magnetic fluxes in opposing directions do, however, flow through said main paths. The fact that the magnetic fluxes flow in opposing directions leads to a partial compensation of said magnetic fluxes which are generated by the electrical current flow in the two conductor loops 118 and 120. In this regard, the magnetic flux which is generated by the current flow in conductor loop 118 is indicated by the course of the magnetic main path 130 and 136. The magnetic flux which is generated by the current flow in conductor loop 120 is indicated by the magnetic main path 132 and 134.

The first main path 130 thereby passes through a section of the first component 92, the first slot 160 designed as an air gap and/or adhesive gap, the first outer long limb 96, a section of the second component 94, the central long limb 100 as well as the second central slot 161 designed as an air gap and/or adhesive gap. The second main path 132 traverses a section of the first component 92, the central long limb 100, a section 94 of the second component, the first outer long limb 96 as well as the first slot 160 designed as an air gap and/or adhesive gap. Provision is made in the case of a third main path 134 for said path to pass through a section of the first component 92, the central slot 161 designed as an adhesive gap, the central long limb 100, a section of the first component 94, through the second outer long limb 98 and the third slot 162 designed as an adhesive gap. The fourth main path 136 passes through a section of the first component 92, the third slot 162 designed as an air gap, the second outer long limb 98, a section of the first component 94, the central long limb 100 as well as the second slot 161 designed as an air gap.

A magnetic resistance of a magnetic main flux along a respective main path 130, 132, 134, 136 is adjusted by means of a width of the slots 160, 161, 162 designed as air gaps and/or adhesive gaps, said width being determined by a thickness of the material, i.e. the film and/or the adhesive, between the ends of the long limbs 96, 98, 100 and the first component 92.

In addition, a magnetic resistance of a leakage flux along a leakage path 122, 124, 126, 128 is defined by means of a width of respectively one slot 107, 108 designed as an air gap, which width is defined in each case by a difference between the length of a long limb 96, 98, 100 and a short limb 102, 104 as well as by a cross-sectional area of a short limb 102, 104. A cross-sectional area of a leakage path 122, 124, 126, 128 is furthermore adjusted by means of a reduced cross-sectional area of a short limb 102, 104. Thus, it is possible to protect a main path 130, 132, 134, 136, which encompasses in each case two leakage paths 122, 124, 126, 128, from saturation by the targeted saturating of a leakage path 122, 124, 126, 128.

In variations of the coupling module 90, it is also possible for the coupling module 90 to use two components 94 embodied with grooves instead of a flat component 92 and a component 94 embodied with grooves. Furthermore, it is possible for the two conductor loops 118, 120 to alternately penetrate the two through-holes 114, 116.

Each of the embodiments of the coupling device 4, 30, 60 is designed for four phases of a multi-phase converter 2, 32, 64 and comprises four coupling modules 6, 8, 12, 14, 34, 36, 38, 40, 64, 66, 68, 70, 90. Each coupling module 6, 8, 12, 14, 34, 36, 38, 40, 64, 66, 68, 70, 90 thereby comprises four through-holes disposed parallel to one another 110, 112, 114, 116, 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004, 6401, 6402, 6403, 6404, 6601, 6602, 6603, 6604, 6801, 6802, 6803, 6804, 7001, 7002, 7003, 7004, wherein at least one section of a conductor loop 18, 20, 22, 24, 42, 44, 46, 48, 72, 74, 76, 78, 118, 120 for a phase penetrates a through-hole 110, 112, 114, 116, 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004, 6401, 6402, 6403, 6404, 6601, 6602, 6603, 6604, 6801, 6802, 6803, 6804, 7001, 7002, 7003, 7004 of a coupling module 6, 8, 12, 14, 34, 36, 38, 40, 64, 66, 68, 70, 90. Sections of conductor loops 18, 20, 22, 24, 42, 44, 46, 48, 72, 74, 76, 78, 118, 120 for at least two phases penetrate all four through-holes 110, 112, 114, 116, 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004, 6401, 6402, 6403, 6404, 6601, 6602, 6603, 6604, 6801, 6802, 6803, 6804, 7001, 7002, 7003, 7004 of a coupling module 6, 8, 12, 14, 34, 36, 38, 40, 64, 66, 68, 70, 90.

Provision is furthermore made for at least one coupling module 6, 8, 12, 14, 34, 36, 38, 40, 64, 66, 68, 70, 90 to form a plane of the coupling device 4, 30, 60, wherein at least four through-holes 110, 112, 114, 116, 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004, 6401, 6402, 6403, 6404, 6601, 6602, 6603, 6604, 6801, 6802, 6803, 6804, 7001, 7002, 7003, 7004 penetrate each plane, wherein at least one section of a conductor loop 18, 20, 22, 24, 42, 44, 46, 48, 72, 74, 76, 78, 118, 120 for each of the four phases penetrates through-holes 110, 112, 114, 116, 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004, 6401, 6402, 6403, 6404, 6601, 6602, 6603, 6604, 6801, 6802, 6803, 6804, 7001, 7002, 7003, 7004 of each plane.

In the first and second embodiment, a plane comprises in each case two coupling modules 6, 8, 12, 14, 34, 36, 38, 40 comprising eight through-holes 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004. In the third embodiment of the coupling device 62, a plane comprises only one coupling module 64, 66, 68, 70 comprising four through-holes 3401, 3402, 3403, 3404, 3601, 3602, 3603, 3604, 3801, 3802, 3803, 3804, 4001, 4002, 4003, 4004, 6401, 6402, 6403, 6404, 6601, 6602, 6603, 6604, 6801, 6802, 6803, 6804, 7001, 7002, 7003, 7004. A plurality of, as a rule two, coupling modules 90, as presented with the aid of FIG. 4, can form a plane of the fourth embodiment of the coupling device.

Half of the phases which are to be transported through sections of conductor loops 18, 20, 22, 24, 42, 44, 46, 48, 72, 74, 76, 78, 118, 120 and are guided through a plane are guided in a first direction and the other half of the phases are guided in a second direction, wherein the first direction and the second direction are oriented oppositely to one another. During an operation of the coupling device 4, 30, 60, one phase through a section of a conductor loop 18, 20, 22, 24, 42, 44, 46, 48, 72, 74, 76, 78 is to be transported in the same direction or in the opposite direction in which the respective section of the conductor loop 18, 20, 22, 24, 42, 44, 46, 48, 72, 74, 76, 78 penetrates said plane. In the first embodiment, each phase is guided twice through two through-holes 601, 602, 603, 604, 801, 802, 803, 804, 1201, 1202, 1203, 1204, 1401, 1402, 1403, 1404 of a coupling module 6, 8, 12, 14 and a plane, namely twice through a through-hole 601, 602, 603, 604, 801, 802, 803, 804, 1201, 1202, 1203, 1204, 1401, 1402, 1403, 1404 in the first direction as well as twice through a further through-hole 601, 602, 603, 604, 801, 802, 803, 804, 1201, 1202, 1203, 1204, 1401, 1402, 1403, 1404 in the other direction.

In the second embodiment, each phase to be transported through a conductor loop 42, 44, 46, 48 is guided only once through a coupling module 34, 36, 38, 40, however twice in opposite directions through a plane formed from two coupling modules 34, 36, 38, 40. In the second embodiment, it is also possible for each conductor loop 42, 44, 46, 48 to be guided twice through a coupling module 34, 36, 38, 40. In this implementation, it is conceivable that a connecting section of a conductor loop 42, 44, 46, 48 or a corresponding winding is of U-shaped configuration. In addition, a first section of the conductor loop 42, 44, 46, 48 is to be inserted into a first through-hole 3401, 3402, 3403, 3404, 3601, 3602, 3603, 3604, 3801, 3802, 3803, 3804, 4001, 4002, 4003, 4004 of the coupling module 34, 36, 38, 40 and a second section of the conductor loop 42, 44, 46, 48 is to be inserted into a second through-hole 3401, 3402, 3403, 3404, 3601, 3602, 3603, 3604, 3801, 3802, 3803, 3804, 4001, 4002, 4003, 4004 of the same coupling module 34, 36, 38, 40. A connection between the two sections of the conductor loop 42, 44, 46, 48 can be implemented via welded connections at open end of the U-shaped connecting section of the conductor loop 42, 44, 46, 48, with which an end of the first section of the conductor loop 42, 44, 46, 48 is to be connected to an end of the second section of the conductor loop 42, 44, 46, 48.

In the third embodiment, each conductor loop 72, 74, 76, 78 is in each case guided once through a coupling module 64, 66, 68, 70 and therefore through a plane.

At least in the first, third and fourth embodiment, structures comprising one, two or multiple feed-throughs of a conductor loop 18, 20, 22, 24, 72, 74, 76, 78, 118, 120 through a coupling module 18, 20, 22, 24, 72, 74, 76, 78, 90 are conceivable, wherein the number of feed-throughs is typically in the small single digit range. In regard to the coupling module 90 from FIG. 4, which is designed for the fourth embodiment of the coupling device, each conductor loop 118, 120 penetrates two through-holes 110, 112, 114, 116, wherein respectively one conductor loop 118, 120 penetrates a first through-hole 110, 112, 114, 116 in a first direction and a further second through-hole 110, 112, 114, 116 in a second, opposite direction.

In the first embodiment of the coupling device 4, sections of conductor loops 18, 20, 22, 24, 42, 44, 46, 48, 72, 74, 76, 78 for two phases penetrate the through-holes 601, 602, 603, 604, 801, 802, 803, 804, 1201, 1202, 1203, 1204, 1401, 1402, 1403, 1404 of each coupling module 6, 8, 12, 14, two sections of a conductor loop 18, 20, 22, 24 of a phase penetrating each through-hole 601, 602, 603, 604, 801, 802, 803, 804, 1201, 1202, 1203, 1204, 1401, 1402, 1403, 1404 in the same direction.

In the second and third embodiment of the coupling device 30, 60, sections of conductor loops 18, 20, 22, 24, 42, 44, 46, 48, 72, 74, 76, 78 for four phases penetrate the through-holes 3401, 3402, 3403, 3404, 3601, 3602, 3603, 3604, 3801, 3802, 3803, 3804, 4001, 4002, 4003, 4004, 6401, 6402, 6403, 6404, 6601, 6602, 6603, 6604, 6801, 6802, 6803, 6804, 7001, 7002, 7003, 7004 of each coupling module 34, 36, 38, 40, 64, 66, 68, 70, one section of a conductor loop 42, 44, 46, 48, 72, 74, 76, 78 of a phase penetrating each through-hole 3401, 3402, 3403, 3404, 3601, 3602, 3603, 3604, 3801, 3802, 3803, 3804, 4001, 4002, 4003, 4004, 6401, 6402, 6403, 6404, 6601, 6602, 6603, 6604, 6801, 6802, 6803, 6804, 7001, 7002, 7003, 7004.

In the case of the coupling devices 4, 30 pursuant to the first and second embodiment which have respectively two pairs of coupling modules 6, 8, 12, 14, 34, 36, 38, 40 that form a plane, the coupling modules 6, 8, 12, 14, 34, 36, 38, 40 of respectively one pair of coupling modules 6, 8, 12, 14, 34, 36, 38, 40 are disposed parallel one beside the other so as to be perpendicularly oriented to the through-holes 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004. The two pairs are disposed successively and the through-holes **601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004 of both pairs are oriented in the same direction, the two pairs being rotated 90 degrees with respect to one another.

A coupling module 6, 8, 12, 14, 34, 36, 38, 40, 64, 66, 68, 70, 90 can comprise at least two components 92, 94 consisting of ferrite material and two pairs of through-holes 110, 112, 114, 116, 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004, wherein two usually adjacent through-holes 110, 112, 114, 116, 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004 are connected to one another via a slot 107, 108, 160, 161, 162, 605, 805, 1205, 1405, 3405, 3406, 3605, 3606, 3805, 3806, 4005, 4006, 6405, 6406, 6605, 6606, 6805, 6806, 7005, 7006 which can be designed as an air gap or an adhesive gap.

A coupling module 6, 8, 12, 14, 34, 36, 38, 40, 64, 66, 68, 70, 90 can be cuboid-shaped in cross section and thereby have, as the case may be, rounded off corners. It is however also possible for a coupling module 6, 8, 12, 14, 34, 36, 38, 40, 64, 66, 68, 70, 90 to have a semicircular design.

The multi-phase converter described comprises at least one previously described coupling device 4, 30, 60 and can be designed as a four-phase converter for the case that the multi-phase converter 2, 32, 64 has precisely such a coupling device 4, 30, 60.

The invention claimed is:

1. A coupling device for all phases of a four-phase converter (2, 32, 62), said coupling device including four coupling modules (6, 8, 12, 14, 34, 36, 38, 40, 64, 66, 68, 70, 90), wherein each coupling module (6, 8, 12, 14, 34, 36, 38, 40, 64, 66, 68, 70, 90) encompasses four parallel through-holes (110, 112, 114, 116, 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004, 6401, 6402, 6403, 6404, 6601, 6602, 6603, 6604, 6801, 6802, 6803, 6804, 7001, 7002, 7003, 7004), wherein at least one section of a conductor loop (18, 20, 22, 24, 72, 74, 76, 78, 118, 120) for a phase penetrates a through-hole (110, 112, 114, 116, 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004, 6401, 6402, 6403, 6404, 6601, 6602, 6603, 6604, 6801, 6802, 6803, 6804, 7001, 7002, 7003, 7004) of a coupling module (6, 8, 12, 14, 34, 36, 38, 40, 64, 66, 68, 70, 90), wherein sections of conductor loops (18, 20, 22, 24, 72, 74, 76, 78, 118, 120) for at least two phases penetrate all four through-holes (110, 112, 114, 116, 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004, 6401, 6402, 6403, 6404, 6601, 6602, 6603, 6604, 6801, 6802, 6803, 6804, 7001, 7002, 7003, 7004) of a coupling module (6, 8, 12, 14, 34, 36, 38, 40, 64, 66, 68, 70, 90); wherein at least one coupling module (6, 8, 12, 14, 34, 36, 38, 40, 64, 66, 68, 70, 90) forms a plane of the coupling device (4, 30, 60), wherein at least four through-holes (110, 112, 114, 116, 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004, 6401, 6402, 6403, 6404, 6601, 6602, 6603, 6604, 6801, 6802, 6803, 6804, 7001, 7002, 7003, 7004) penetrate each plane, wherein at least one section of a conductor loop (18, 20, 22, 24, 72, 74, 76, 78, 118, 120) for each of the four phases penetrates the through-holes (110, 112, 114, 116, 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004, 6401, 6402, 6403, 6404, 6601, 6602, 6603, 6604, 6801, 6802, 6803, 6804, 7001, 7002, 7003, 7004) of each plane.

2. The coupling device according to claim 1 in which sections of conductor loops (18, 20, 22, 24, 72, 74, 76, 78, 118, 120) penetrate a plane, wherein half of the phases flow in a first direction and the other half in a second direction through the plane during operation of the coupling device (4, 30, 60, 90), the first direction and the second direction being oriented oppositely one another.

3. The coupling device according to claim 1, in which sections of conductor loops (18, 20, 22, 24) for two phases penetrate the through-holes (601, 602, 603, 604, 801, 802, 803, 804, 1201, 1202, 1203, 1204, 1401, 1402, 1403, 1404) of each coupling module (6, 8, 12, 14), at least two sections of a conductor loop (18, 20, 22, 24) of a phase penetrating each through-hole (601, 602, 603, 604, 801, 802, 803, 804, 1201, 1202, 1203, 1204, 1401, 1402, 1403, 1404).

4. The coupling device according to claim 1, in which sections of conductor loops (42, 44, 46, 48, 72, 74, 76, 78) for four phases penetrate the through-holes (3401, 3402, 3403, 3404, 3601, 3602, 3603, 3604, 3801, 3802, 3803, 3804, 4001, 4002, 4003, 4004, 6401, 6402, 6403, 6404, 6601, 6602, 6603, 6604, 6801, 6802, 6803, 6804, 7001, 7002, 7003, 7004) of each coupling module (34, 36, 38, 40, 64, 66, 68, 70), at least one section of a conductor loop (42, 44, 46, 48, 72, 74, 76, 78) of a phase penetrating each through-hole (3401, 3402, 3403, 3404, 3601, 3602, 3603, 3604, 3801, 3802, 3803, 3804, 4001, 4002, 4003, 4004, 6401, 6402, 6403, 6404, 6601, 6602, 6603, 6604, 6801, 6802, 6803, 6804, 7001, 7002, 7003, 7004).

5. The coupling device according to claim 1, in which two adjacently disposed through-holes (110, 112, 114, 116, 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004, 6401, 6402, 6403, 6404, 6601, 6602, 6603, 6604, 6801, 6802, 6803, 6804, 7001, 7002, 7003, 7004) of a coupling module (6, 8, 12, 14, 34, 36, 38, 40, 64, 66, 68, 70, 90) are connected to one another via a slot (107, 108, 160, 161, 162, 605, 805, 1205, 1405, 3405, 3406, 3605, 3606, 3805, 3806, 4005, 4006, 6405, 6406, 6605, 6606, 6805, 6806, 7005, 7006).

6. The coupling device according to claim 1 which comprises two pairs of coupling modules (6, 8, 12, 14, 34, 36, 38, 40, 64, 66, 68, 70, 90), in which coupling modules (6, 8, 12, 14, 34, 36, 38, 40, 64, 66, 68, 70, 90) of respectively one pair of coupling modules (6, 8, 12, 14, 34, 36, 38, 40, 64, 66, 68, 70, 90) are disposed parallel one beside the other so as to be perpendicularly oriented to the through-holes (110, 112, 114, 116, 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004), wherein the two pairs are successively disposed and the through-holes (110, 112, 114, 116, 601, 602, 603, 604, 801, 802, 803, 804, 1201, 1202, 1203, 1204, 1401, 1402, 1403, 1404, 3401, 3402, 3403, 3404, 3601, 3602, 3603, 3604, 3801, 3802, 3803, 3804, 4001, 4002, 4003, 4004) of both pairs are oriented in the same direction, and wherein the two pairs are rotated by 90 degrees with respect to one another.

7. The coupling device according to claim 1, in which each coupling module (6, 8, 12, 14, 34, 36, 38, 40, 64, 66, 68, 70, 90) comprises ferrite material.

8. The coupling device according to claim 1, in which each coupling module (6, 8, 12, 14, 34, 36, 38, 40, 64, 66, 68, 70, 90) is of cuboid-shaped design.

9. A multiphase converter which comprises at least one coupling device (4, 30, 60, 90) according to claim 1.

10. The multiphase converter according to claim 9, which is designed as a four-phase converter.

* * * * *